Jan. 22, 1924.

J. D. SMITH 1,481,752

ADJUSTABLE SLIP COVER FOR AUTOMOBILE SEATS

Filed Sept. 28, 1922

Inventor
Jennings D. Smith

By Shriver, Crowe & Gordon
Attorneys

Patented Jan. 22, 1924.

1,481,752

UNITED STATES PATENT OFFICE.

JENNINGS D. SMITH, OF TAMPA, FLORIDA.

ADJUSTABLE SLIP COVER FOR AUTOMOBILE SEATS.

Application filed September 28, 1922. Serial No. 591,030.

*To all whom it may concern:*

Be it known that I, JENNINGS D. SMITH, a citizen of the United States, residing at Tampa, in the county of Hillsborough and State of Florida, have invented new and useful Improvements in Adjustable Slip Covers for Automobile Seats, of which the following is a specification.

This invention generically appertains to slip covers, but it more especially comprehends those designed for use in connection with automobile seats where it is desired to employ an auxiliary covering for the seat.

The principal feature of this invention is the provision of a cover which may be quickly and expeditiously attached to or detached from an automobile seat.

Another important feature of this invention resides in providing a one-piece cover for covering the back and seat portions of an automobile seat, and of means for securing the cover evenly over the entire upholstered surfaces of the horizontal and perpendicular portions of the automobile seat.

A further important feature of this invention is the provision of means for adjustably securing the cover to various sized automobile seats, so designed that the horizontal or cushion portion of the seat may be removed to admit of access to the compartment beneath without having to disturb the slip cover during the removal or replacement of the cushion.

Figure 1:
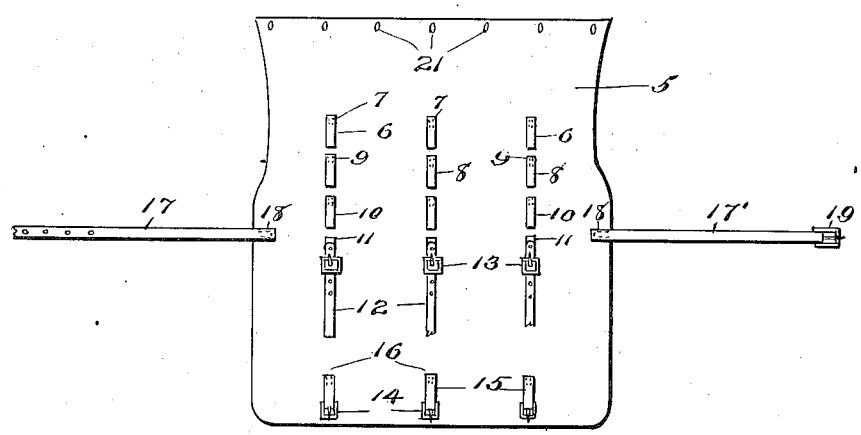

With these and other objects in view which will become apparent as the description proceeds, the invention resides in the construction, combination and arrangement of parts, hereinafter more fully described and claimed, and illustrated in the accompanying drawings, in which like characters of references indicate like parts throughout the several figures, of which:

Figure 1, a bottom plan view of my slip cover, showing the adjustable straps detached from their respective anchoring straps.

Figure 2:
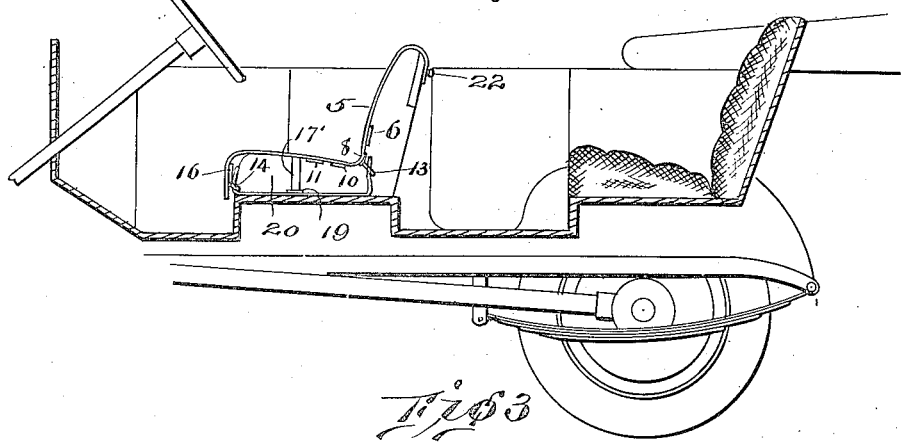
Figure 3:
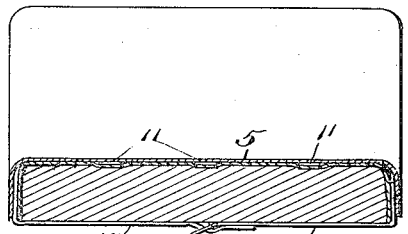

Figure 2, a perspective view of an automobile with parts broken away, illustrating my invention as applied to an automobile seat; and Figure 3 is a similar view to Figure 2 with the cushion portion in section on the line 3—3 illustrating the longitudinal straps in position.

In the illustrated embodiment characterizing this invention there is shown a substantially rectangular piece of cloth or fabric 5, at a point spaced from the upper edge of the cover approximating the depth of the back of the seat are positioned a series of short straps 6 sewed or otherwise secured to the underside of the slip cover, as at 7, and spaced from the straps 6 are similar straps 8 secured as at 9. Relatively spaced downwardly are the straps 10 and straps 11 corresponding to and secured similar to the straps 6 and 8. The long straps 12 are provided at their upper ends with buckles 13 for securing these straps to whichever series of the short straps 6, 8, 10 or 11, it may be desired to fasten them according to the depth of the back and seat portions of the automobile seat it is desired to cover. The free end of the straps 12 are intended to pass through the buckles or other securing means 14 attached to the free ends of straps 15, sewed or otherwise secured to the cover 5 spaced from its lower end, as at 16.

The long straps 17 and 17' have their inner ends secured to the undersurface of the cloth covering spaced from the edges of the covering, as at 18, and at a point substantially coincident with the median line between the straps 6, 8, 10, 11, and straps 15. One of the said straps 17' may be equipped with a buckle 19 for cooperation with the free end of strap 17 when the said straps are in operative position around the cushion 20. The cover 5 is provided along its upper edge with buttonholes 21 for cooperation with the correspondingly positioned pins 22 carried by the automobile back 23.

To apply this cover to an automobile seat the buttonholes 21 are fitted over the pins 22; straps 12 are fastened to whichever of the series of short straps 6, 8, 10 or 11 that come to the junction of the cushion 20 with the back 23, and are then passed under the cushion and through the buckles 14 attached to the straps 15. When drawn taut the cover is secured tightly and evenly over the cushion surface of the back 23 and the cushion 20 so that to outward appearances the two cushion surfaces appear to be covered separately, then the straps 17 and 17' are passed under and longitudinally of the cushion 20, which when the free ends have been secured together the cover is prevented from slipping either longitudinally or laterally of the cushion seat.

Many efforts have been made to provide a seat-covering for automobile seats which could be easily attached to and detached from the seat proper, but most of these have proven unsatisfactory, in that, they would not stay in place but would crawl from the top of the back towards the front of the cushion, generally tearing loose from some point, proving uncomfortable by wrinkling, and it was to overcome these deficiencies and to effect a cover that even under the strain of rough vehicular travel would remain evenly distributed over the surface of the seat, that I designed the slip cover forming the subject matter of this invention.

From the above it will be apparent that I have designed a slip cover eliminating the deficiencies of those now in use, adjustable to various types and sizes of automobile seats, quickly and expeditiously attached to or detached from the seat and rendering it easy to remove the cushion from its normal position in the car without interfering with the seat cover.

In practice, I have found that the form of my invention illustrated in the accompanying drawings and referred to in the above description, as the preferred embodiment, is the most efficient and practical; yet realizing the conditions concurrent with the adoption of my device will necessarily vary, I desire to emphasize that various minor changes in details of construction, proportion and arrangement of parts, may be resorted to within the scope of the appended claims without departing from or sacrificing any of the principles of this invention.

Having thus described my invention, and without enumerating variations and equivalents, what I desire protected by Letters Patent is as set forth in the following claims:

1. A seat cover formed from a single piece of material foldable transversely of its length to provide back and seat covering portions, the line of fold being shiftable to increase or decrease the depth of the back portion, rows of anchoring straps attached to the cover substantially central of its length in spaced, transverse, and longitudinal alignment, a row of straps attached to the cover spaced from its lower end, straps attachable to a selected row of the first mentioned anchoring straps and to the last mentioned row for securing the cover taut over the cushion surface against transverse displacement, and straps attached to the cover spaced from either edge thereof, and means for attaching the free ends together to further secure the cover to the cushion and to prevent its longitudinal displacement.

2. A seat cover having back and seat cover portions, a plurality of short straps secured to the under side of the cover, said short straps being disposed in laterally spaced parallel columns extending lengthwise of the cover, attachment means at one end of the cover for engagement with the back of a seat and securing straps at the opposite end of the cover in alignment with the said columns of short straps, said securing straps being, respectively, secured to the cover on the under side thereof and in spaced relation to its lower end, the free end of each securing strap being selectively engageable with any of the short straps of the corresponding column.

JENNINGS D. SMITH.

Witnesses:
E. L. BRYAN,
THOS. J. HEITER.